United States Patent
Yoshinaga

(10) Patent No.: US 12,542,061 B2
(45) Date of Patent: Feb. 3, 2026

(54) SHIP MONITORING DEVICE, SHIP MONITORING METHOD AND A NON-TRANSITORY COMPUTER-READABLE MEDIUM

(71) Applicant: Furuno Electric Co., Ltd., Nishinomiya (JP)

(72) Inventor: Makoto Yoshinaga, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 145 days.

(21) Appl. No.: 18/517,010

(22) Filed: Nov. 22, 2023

(65) Prior Publication Data

US 2024/0087459 A1 Mar. 14, 2024

Related U.S. Application Data

(63) Continuation-in-part of application No. PCT/JP2022/009936, filed on Mar. 8, 2022.

(30) Foreign Application Priority Data

May 26, 2021 (JP) ................................. 2021-088609

(51) Int. Cl.
*G08G 3/02* (2006.01)
*B63B 49/00* (2006.01)
*B63B 79/40* (2020.01)

(52) U.S. Cl.
CPC ............... *G08G 3/02* (2013.01); *B63B 49/00* (2013.01); *B63B 79/40* (2020.01)

(58) Field of Classification Search
CPC ......... G08G 3/02; G01S 19/14; G01S 13/937; G01C 21/005; G01C 21/203; B63B 79/40; B63B 49/00; G06F 3/04
See application file for complete search history.

(56) References Cited

U.S. PATENT DOCUMENTS

| | | | | |
|---|---|---|---|---|
| 11,545,115 B1 * | 1/2023 | McQueen | ............. | G06F 3/0482 |
| 12,304,599 B2 * | 5/2025 | Nakagawa | ............. | G06Q 50/40 |

(Continued)

FOREIGN PATENT DOCUMENTS

| | | | | |
|---|---|---|---|---|
| AU | 2003209857 B2 * | 3/2008 | ............. | B61L 25/023 |
| CN | 116438110 A * | 7/2023 | ........... | G01C 21/203 |

(Continued)

OTHER PUBLICATIONS

An English translated version for JP-4467709-B2 (Honda'709).*

(Continued)

*Primary Examiner* — Cuong H Nguyen
(74) *Attorney, Agent, or Firm* — XSENSUS LLP

(57) ABSTRACT

A ship monitoring device includes processing circuitry that acquires first and second ship data indicative of a position and a velocity of a first ship and a second ship. It identifies, a first area of an estimated course of the second ship, where a risk of the first ship and the second ship colliding with each other becomes more than a given value, and a second area separated from the first area in a traveling direction of the second ship. It displays a first collision risk area including the first area, and a second collision risk area including the second area, and displays an end part of the first collision risk area on the second area side and an end part of the second collision risk area on the first area side so as to be discriminated from the remaining end parts.

18 Claims, 8 Drawing Sheets

(56) References Cited

U.S. PATENT DOCUMENTS

| | | | | |
|---|---|---|---|---|
| 2009/0106126 | A1* | 4/2009 | Asano | G06Q 30/0601 |
| | | | | 705/40 |
| 2009/0315756 | A1* | 12/2009 | Imazu | B63B 49/00 |
| | | | | 342/41 |
| 2017/0067984 | A1 | 3/2017 | Nakahama et al. | |
| 2017/0243485 | A1* | 8/2017 | Rubin | H04W 4/46 |
| 2019/0342859 | A1* | 11/2019 | Rubin | H04W 4/12 |
| 2020/0117192 | A1* | 4/2020 | Satoh | B62D 6/00 |
| 2022/0348297 | A1* | 11/2022 | Nakagawa | B63B 49/00 |
| 2024/0317368 | A1* | 9/2024 | Akiike | B63B 49/00 |

FOREIGN PATENT DOCUMENTS

| | | | | |
|---|---|---|---|---|
| EP | 2757517 A1 * | 7/2014 | | G06F 18/22 |
| JP | S62-118282 A | 5/1987 | | |
| JP | 4467709 B2 * | 5/2010 | | G01C 21/3415 |
| JP | 2017-054215 A | 3/2017 | | |
| WO | WO-2017167905 A1 * | 10/2017 | | G01S 13/865 |
| WO | 2020/008776 A1 | 1/2020 | | |
| WO | WO-2020003856 A1 * | 1/2020 | | B63B 49/00 |
| WO | WO-2020166083 A1 * | 8/2020 | | G01C 21/203 |
| WO | WO-2022113606 A1 * | 6/2022 | | G01C 21/203 |

OTHER PUBLICATIONS

An English translated version for WO-2020003856-A1(Furuno'856).*
A PTAB decision on 35 USC 101 for U.S. Appl. No. 17/308,721 (published 2025).*
Cheng, Zhaoxi, et al. "Novel collision risk measurement method for multi-ship encounters via velocity obstacles and temporal proximity." Ocean Engineering 302 (2024): 117585. (Year: 2024).*
Zhu, Jixiang, et al. "Multi-ship encounter situation identification and analysis based on AIS data and graph complex network theory." Journal of Marine Science and Engineering 10.10 (2022): 1536. (Year: 2022).*
Huang IL, Lee MC, Chang L, Huang JC. Development and Application of an Advanced Automatic Identification System (AIS)-Based Ship Trajectory Extraction Framework for Maritime Traffic Analysis. Journal of Marine Science and Engineering. Sep. 18, 2024; 12(9): 1672. (Year: 2024).*
Tengesdal, Trym, Sverre V. Rothmund, Erlend A. Basso, Henrik Schmidt-Didlaukies, and Tor A. Johansen. "Obstacle Intention Awareness in Automatic Ship Collision Avoidance: Full-Scale Experiments in Confined Waters." Field Robotics 4 (2024): 211-245. (Year: 2024).*
International Search Report and Written Opinion mailed on May 10, 2022, received for PCT Application PCT/JP2022/009936, filed on Mar. 8, 2022, 8 pages including English Translation.
Imazu et al., "Obstacle Zone by Target and its Expression", The Journal of Japan Institute of Navigation, vol. 107, 2002, pp. 191-197 (7 pages including English Abstract).

* cited by examiner

SHIP MONITORING DEVICE, SHIP MONITORING METHOD AND A NON-TRANSITORY COMPUTER-READABLE MEDIUM

CROSS-REFERENCE TO RELATED APPLICATION(S)

This application is a continuation-in-part application of PCT International Application No. PCT/JP2022/009936, which was filed on Mar. 8, 2022, and which claims priority to Japanese Patent Application No. 2021-088609 filed on May 26, 2021, the entire disclosures of each of which are herein incorporated by reference for all purposes.

TECHNICAL FIELD

The present disclosure relates to a ship monitoring device, a ship monitoring method, and a program.

BACKGROUND ART

Conventionally, various techniques for evaluating a risk of ships colliding to each other exist. For example, Nonpatent Document 1 discloses a technique for displaying an OZT (Obstacle Zone by Target).

REFERENCE DOCUMENT(S) OF CONVENTIONAL ART

Nonpatent Document

[Nonpatent Document 1] IMAZU, Hayama, FUKUTO, Junji, and NUMANO, Masayoshi, "Obstacle Zone by Targets and Its Expression", The Journal of Japan Institute of Navigation, 2002, Vol. 107, pp. 191-197

DESCRIPTION OF THE DISCLOSURE

Problem(s) to be Solved by the Disclosure

Meanwhile, according to the technique for displaying a collision risk area such as the OZT, a ship can travel within an area of an estimated course of another ship where no OZT is displayed. However, it is difficult to grasp whether the ship passes through the front or the rear of another ship, by just glancing at such an area.

The present disclosure is made in view of the problem described above, and one main purpose thereof is to provide a ship monitoring device, a ship monitoring method, and a program, which are capable of easily grasping whether a ship passes through the front or the rear of another ship.

SUMMARY OF THE DISCLOSURE

In order to solve the above-described problem, a ship monitoring device according to one aspect of the present disclosure includes a first data acquiring part, a second data acquiring part, a risk area identifying part, and a display controlling part. The first data acquiring part acquires first ship data indicative of a position and a velocity of a first ship. The second data acquiring part acquires second ship data indicative of a position and a velocity of a second ship. The risk area identifying part identifies, based on the first ship data and the second ship data, when assuming that the first ship changes the course in an arbitrary direction and crosses an estimated course of the second ship, a first area of the estimated course of the second ship, where a risk of the first ship and the second ship colliding each other becomes more than a given value, and a second area separated from the first area in a traveling direction of the second ship. The display controlling part displays, on the estimated course of the second ship in an image indicative of the positions of the first ship and the second ship, a first collision risk area including the first area, and a second collision risk area including the second area, and displays an end part of the first collision risk area on the second area side and an end part of the second collision risk area on the first area side so as to be discriminated from the remaining end parts. According to this configuration, since the end parts of the two collision risk areas which sandwich an area where the first ship passes through the front of the second ship are displayed so as to be discriminated from the remaining end parts, it becomes easier to grasp whether the first ship passes through the front or the rear of the second ship.

In the above-described aspect, the display controlling part may make a shape of the end part of the first collision risk area on the second area side and the end part of the second collision risk area on the first area side different from a shape of the remaining end parts. According to this configuration, it becomes easier to grasp whether the first ship passes through the front or the rear of the second ship based on the shape of the end part of the collision risk area.

In the above-described aspect, the end part of the first collision risk area on the second area side and the end part of the second collision risk area on the first area side may have a shape indicative of the traveling direction of the second ship. According to this configuration, it becomes easier to grasp the traveling direction of the second ship.

In the above-described aspect, the end part of the first collision risk area on the second area side may have a shape protruded in the traveling direction of the second ship. According to this configuration, it becomes easier to grasp the traveling direction of the second ship.

In the above-described aspect, the end part of the second collision risk area on the first area side may have a shape dented in the traveling direction of the second ship. According to this configuration, it becomes easier to grasp the traveling direction of the second ship.

In the above-described aspect, an end part of the first collision risk area on the opposite side from the second area side and an end part of the second collision risk area on the opposite side from the first area side may have a semicircular shape. According to this configuration, it becomes easier to discriminate whether the first ship passes through the front or the rear of the second ship.

In the above-described aspect, the display controlling part may add a mark having a given shape to the end part of the first collision risk area on the second area side and the end part of the second collision risk area on the first area side. According to this configuration, it becomes easier to grasp whether the first ship passes through the front or the rear of the second ship based on the mark added to the end part of the collision risk area.

In the above-described aspect, the display controlling part may add a mark having a shape indicative of the traveling direction of the second ship to the end parts of the first collision risk area and the second collision risk area on the traveling direction side of the second ship. According to this configuration, it becomes easier to grasp the traveling direction of the second ship.

In the above-described aspect, the display controlling part may change the number of marks or the shape of the mark according to a speed of the second ship. According to this configuration, it also becomes easier to grasp the speed of the second ship.

In the above-described aspect, the first data may include a position of the first ship detected by a GNSS (Global Navigation Satellite System) receiver mounted on the first ship. Further, the second data may include a position and a velocity of the second ship that are detected by a radar mounted on the first ship. Further, the second data may include a position and a velocity of the second ship that are detected by an AIS (Automatic Identification System) mounted on the first ship.

Further, a ship monitoring method according to another aspect of the present disclosure includes acquiring, by a first data generating part, first ship data indicative of a position and a velocity of a first ship, acquiring, by a second data generating part, second ship data indicative of a position and a velocity of the second ship, identifying, based on the first ship data and the second ship data, when assuming that the first ship changes the course in an arbitrary direction and crosses an estimated course of the second ship, a first area of the estimated course of the second ship, where a risk of the first ship and the second ship colliding each other becomes more than a given value, and a second area separated from the first area in a traveling direction of the second ship, and, displaying, by a display unit, on the estimated course of the second ship in an image indicative of the positions of the first ship and the second ship, a first collision risk area including the first area, and a second collision risk area including the second area, and displaying an end part of the first collision risk area on the second area side and an end part of the second collision risk area on the first area side so as to be discriminated from the remaining end parts. According to this configuration, since the end parts of the two collision risk areas which sandwich an area where the first ship passes through the front of the second ship are displayed so as to be discriminated from the remaining end parts, it becomes easier to grasp whether the first ship passes through the front or the rear of the second ship.

Further, a program according to another aspect of the present disclosure causes a computer to execute processing which includes acquiring first ship data indicative of a position and a velocity of a first ship, acquiring second ship data indicative of a position and a velocity of the second ship, identifying based on the first ship data and the second ship data, when assuming that the first ship changes the course in an arbitrary direction and crosses an estimated course of the second ship, a first area of the estimated course of the second ship, where a risk of the first ship and the second ship colliding each other becomes more than a given value, and a second area separated from the first area in a traveling direction of the second ship, and, displaying on the estimated course of the second ship in an image indicative of the positions of the first ship and the second ship, a first collision risk area including the first area, and a second collision risk area including the second area, and displaying an end part of the first collision risk area on the second area side and an end part of the second collision risk area on the first area side so as to be discriminated from the remaining end parts. According to this configuration, since the end parts of the two collision risk areas which sandwich an area where the first ship passes through the front of the second ship are displayed so as to be discriminated from the remaining end parts, it becomes easier to grasp whether the first ship passes through the front or the rear of the second ship.

MODE FOR CARRYING OUT THE DISCLOSURE

Hereinafter, one embodiment of the present disclosure is described with reference to the drawings.

Figures 1, 2:
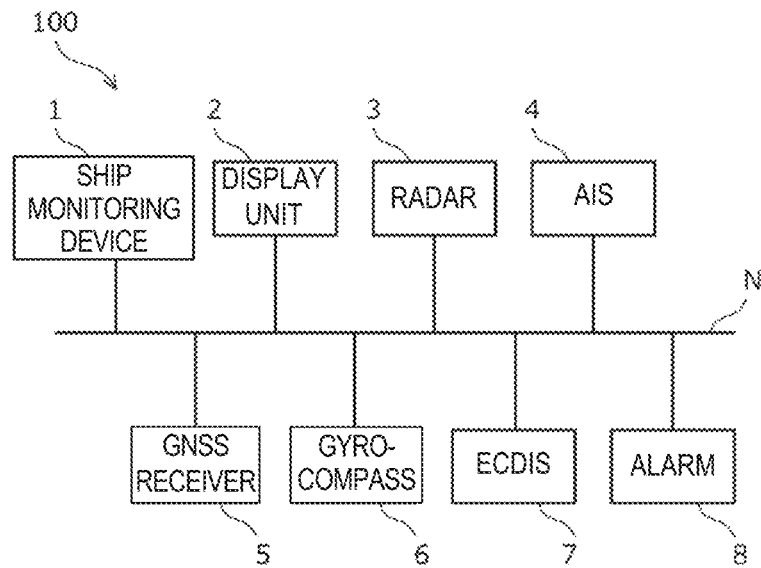
FIG. 1 is a view illustrating one example of a configuration of a ship monitoring system.
FIG. 2 is a view illustrating one example of an other-ships management database.

FIG. 1 is a block diagram illustrating one example of a configuration of a ship monitoring system 100. A ship monitoring method may be realized in the ship monitoring system 100. The ship monitoring system 100 may be a system which is mounted on a ship and monitors other ships which exist around the ship.

The ship on which the ship monitoring system 100 is mounted is one example of a first ship, and is referred to as "the ship" in the following description. Further, ship(s) which exists around "the ship" is one example of second ship(s), and is referred to as "another ship" or "other ships" in the following description.

Further, in the following description, a "velocity" is a vector quantity (so-called "ship velocity vector") indicative of a speed and a direction, and a "speed" is a scalar quantity.

The ship monitoring system 100 may include a ship monitoring device 1, a display unit 2, a radar 3, an AIS 4, a GNSS receiver 5, a gyrocompass 6, an ECDIS 7, and an alarm 8. These apparatuses may be connected, for example, with a network N, such as a LAN, so that mutual network communications are possible.

The ship monitoring device 1 may be a computer including processing circuitry, a CPU, a RAM, a ROM, a non-volatile memory, and an input/output interface. The CPU of the ship monitoring device 1 may perform information processing according to a program loaded to the RAM from the ROM or the nonvolatile memory.

The program may be supplied, for example, via an information storage medium, such as an optical disc or a memory card, or may be supplied, for example, via a communication network, such as the Internet or the LAN.

The display unit 2 may be a display device with a touch sensor, for example. The touch sensor may detect an instructed position in a screen which is instructed by a finger etc. The instructed position may be inputted not only by the touch sensor but also by a trackball etc.

The radar 3 may transmit a radio wave around the ship, receive a reflection wave thereof, and generate echo data based on a reception signal. Further, the radar 3 may discriminate a target object from the echo data, and generate Target-object Tracking data (TT data) indicative of a position and a velocity of the target object.

The AIS (Automatic Identification System) 4 may receive AIS data from other ship(s) or land controls which exist around the ship. A VDES (VHF Data Exchange System) may also be used, instead of the AIS. The AIS data may include a position, a velocity, etc. of another ship.

The GNSS receiver 5 may detect the position of the ship based on the radio waves received from a GNSS (Global Navigation Satellite System). The gyrocompass 6 may detect a direction (heading or bearing) of the ship. A GPS compass may also be used, instead of the gyrocompass.

The ECDIS (Electronic Chart Display and Information System) 7 may acquire the position of the ship from the GNSS receiver 5, and display the position of the ship on an electronic nautical chart. Further, the ECDIS 7 may also display a scheduled route of the ship on the electronic nautical chart. A GNSS plotter may also be used, instead of the ECDIS.

The alarm 8 may issue an alert when there is a risk of the ship colliding with another ship. For example, the alarm 8 may issue the alert by indication, or may issue the alert by sound or light. The alert by indication may be performed by the display unit 2. That is, the display unit 2 may also serve as the alarm 8.

Although in this embodiment the ship monitoring device 1 is an independent device, it may be integrated with another device, such as the ECDIS 7. That is, the functional parts of the ship monitoring device 1 may be realized by other devices.

Further, although the display unit 2 is also an independent device, a display unit of another device, such as the ECDIS 7, may be used as the display unit 2 which displays an image for indication generated by the ship monitoring device 1.

In this embodiment, the GNSS receiver 5 and the ECDIS 7 are examples of a first data generating part which generates "the-ship data" indicative of a position and a velocity of the ship. In detail, the GNSS receiver 5 may detect the position of the ship, and the ECDIS 7 may detect the velocity of the ship based on a temporal change of the position of the ship.

Alternatively, the velocity of the ship may be detected based on the direction of the ship detected by the gyrocompass 6, and a speed of the ship detected by a ship speed meter (not illustrated).

Further, the radar 3 or the AIS 4 is one example of a second data generating part, which generates "other-ships data" indicative of a position and a velocity of another ship. In detail, the TT data generated by the radar 3 may correspond to "other-ships data." The AIS data generated by the AIS 4 may also correspond to "other-ships data."

FIG. 2 is a view illustrating one example of other-ships management database established in the memory of the ship monitoring device 1. Other-ships data generated by the radar 3 or the AIS 4 may be registered into other-ships management database.

Other-ships management database may include fields, such as an "other-ships identifier," a "position," a "speed," and a "direction." Note that the position and the direction of another ship which are detected by the radar 3 may be converted into a coordinate system which is the same as the GNSS.

Figure 3:
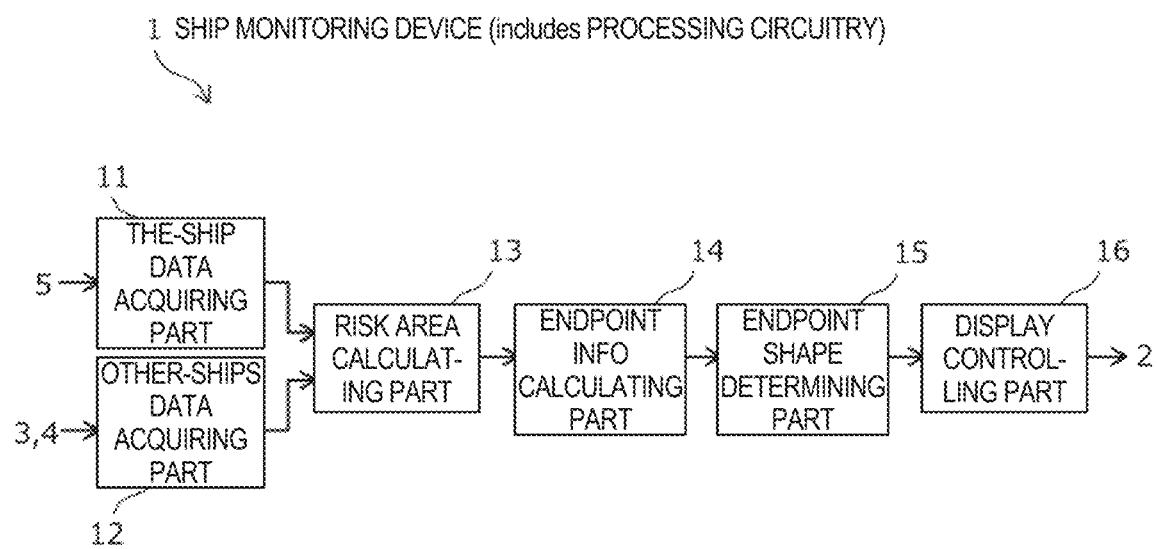
FIG. 3 is a view illustrating one example of a configuration of a ship monitoring device.

FIG. 3 is a view illustrating one example of a configuration of the ship monitoring device 1 which realizes the ship monitoring method. The ship monitoring device 1 may include a the-ship data acquiring part 11, an other-ships data acquiring part 12, a risk area identifying part 13, an endpoint information calculating part 14, an endpoint shape determining part 15, and a display controlling part 16. These functional parts may be realized by the CPU of the ship monitoring device 1 performing information processing according to the program.

The-ship data acquiring part 11 may acquire the-ship data indicative of the position and the velocity of the ship from the GNSS receiver 5 etc. The-ship data acquiring part 11 is one example of a first data acquiring part, and the-ship data is one example of first ship data.

Other-ships data acquiring part 12 may acquire other-ships data indicative of the position and the velocity of another ship from the radar 3 or the AIS 4. Other-ships data acquiring part 12 is one example of a second data acquiring part, and other-ships data is one example of second ship data.

The risk area identifying part 13 may perform a calculation for displaying the OZT (Obstacle Zone by Target) indicating that a risk of the ship and another ship colliding each other is more than a given value based on the-ship data and other-ships data. The OZT is one example of a collision risk area.

Figure 4:
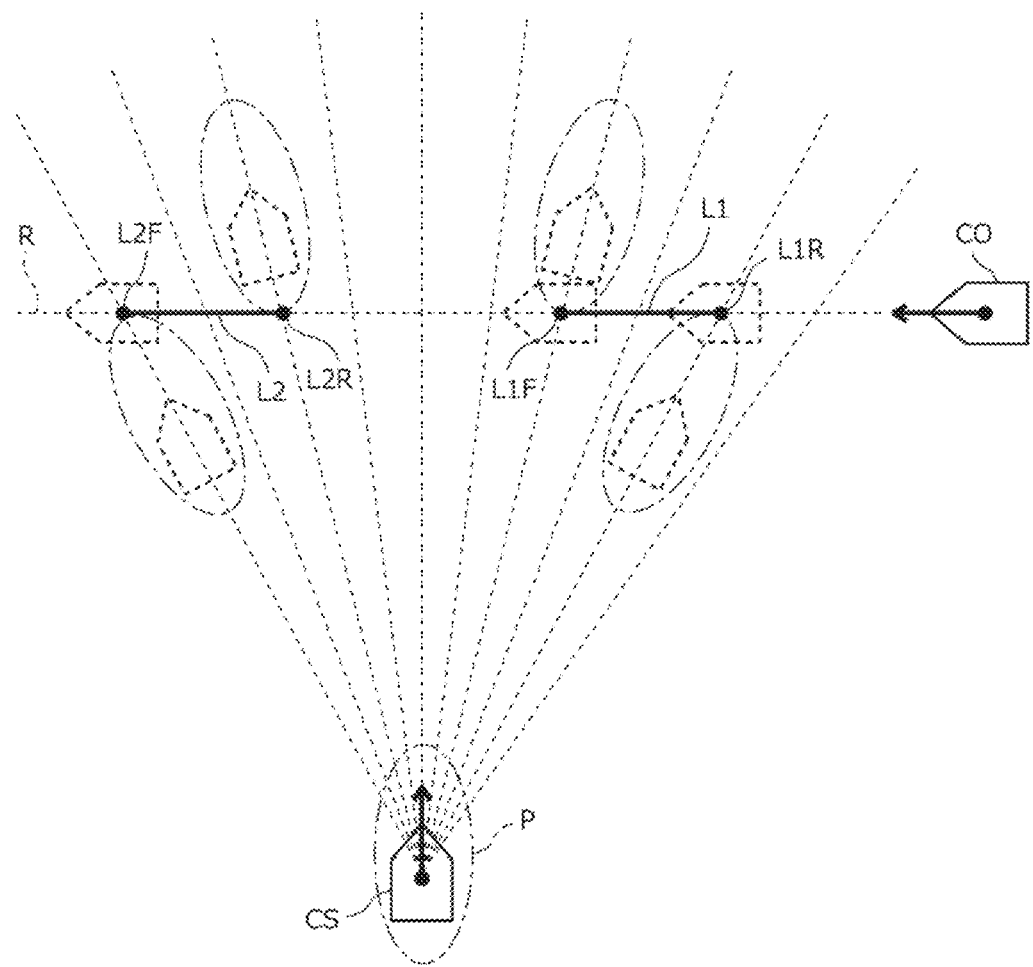
FIG. 4 is a view illustrating one example of a calculation of a collision risk.

FIG. 4 is a view illustrating one example of the calculation of the collision risk. The risk area identifying part 13 may identify risk areas L1 and L2 where a risk of a ship CS colliding with another ship CO becomes more than a threshold, among an estimated course R of another ship CO, based on estimated positions of the ship CS and another ship CO at each timing, when assuming that the ship CS changes the course to an arbitrary direction and crosses the estimated course R of another ship CO.

The calculation of the estimated position of the ship CS may be performed under an assumption that the ship CS travels after it changed the course in an arbitrary direction at the current position, while maintaining the speed. That is, it may be assumed that the ship CS changes the direction of the-ship velocity vector to an arbitrary direction at a reference timing, while the magnitude of the-ship velocity vector is constant, and, after that, the ship CS continues the travel from the ship position at the reference timing in the fixed direction. Therefore, the estimated position of the ship CS at each timing may exist on a concentric circle centering on the ship position at the reference timing. The radius of the circle can be expressed by a product of a lapsed time from the reference timing and the magnitude of the-ship velocity vector.

The estimated position of the ship CS at each timing can be expressed by a plurality of concentric circles calculated at a plurality of discrete timings, respectively. Alternatively, the estimated position of the ship CS at each timing may be expressed by a formula of a circle taking the lapsed time from the reference timing into consideration.

Although in this embodiment the estimated position of the ship CS is calculated under the assumption that the speed of the ship CS is constant, the speed of the ship CS may be treated as a variable which changes with time. That is, the speed of the ship CS may not be constant, as long as the estimated position of the ship CS according to the lapsed time from the reference timing can be obtained. For example, the speed of the ship CS may gradually increase or decrease with progress of time.

The calculation of the estimated position of another ship CO may be performed under an assumption that another ship CO travels from the current position, while maintaining the velocity. That is, it may be assumed that another ship CO continues the travel from an another-ship position at a reference timing, where the magnitude and the direction of the another-ship velocity vector are constant. Therefore, the estimated position of another ship CO at each timing may exist on a straight line which is an extension of the another-ship velocity vector passing through the another-ship position at the reference timing.

The estimated positions of another ship CO at the timings can be expressed by a plurality of discrete points lined up on the straight line, which are calculated for the plurality of discrete timings. Alternatively, the estimated position of another ship CO at each timing may also be expressed by a linear function which passes through the another-ship position at the reference timing.

Although in this embodiment the estimated position of another ship CO is calculated under the assumption that the velocity of another ship CO is constant, at least one of the speed and the direction of another ship CO may be treated as a variable which varies with time. That is, the velocity of another ship CO may not be constant, as long as the estimated position of another ship CO according to the lapsed time from the reference timing can be obtained. For example, the speed of another ship CO may increase or decrease gradually with progress of time. Further, another ship CO may change the course to a given direction, or it may turn at a given ROT (Rate of Turn).

The risk area identifying part 13 may calculate a separated distance between the estimated position of the ship CS and the estimated position of another ship CO at each timing, and calculate the risk of a collision based on the separated distance and the ship size. As described above, since the estimated position of the ship CS at a certain timing can be expressed by a circle, the risk area identifying part 13 may calculate the separated distance by extracting the position nearest to the estimated position of another ship CO at this timing, from the circle indicative of the estimated positions of the ship CS at the certain timing.

The risk area identifying part 13 may identify a plurality of risk areas L1 and L2 where the risk of a collision is more than a threshold, while assuming that the risk of a collision is more than the threshold, for example, when a cautious area P set in the area of the ship CS or around the ship CS overlaps with the point indicative of the estimated position of another ship CO. Below, the traveling direction of another ship CO is referred to as "front" or "forward," and the opposite direction is referred to as "rear" or "rearward."

For example, among the two risk areas L1 and L2, as for the first risk area L1 which is located on the rear side, a rear end L1R of the first risk area L1 may be located at a position where a front end of the cautious area P of the ship contacts a point indicative of the estimated position of another ship CO. A front end L1F of the first risk area L1 may be located at a position where a rear end of the cautious area P of the ship contacts a point indicative of the estimated position of another ship CO.

On the other hand, among the two risk areas L1 and L2, as for the second risk area L2 which is located on the front side, a rear end L2R of the second risk area L2 may be located at a position where a rear end of the cautious area P of the ship contacts a point indicative of the estimated position of another ship CO. A front end L2F of the second risk area L2 may be located at a position where a front end of the cautious area P of the ship contacts a point indicative of the estimated position of another ship CO.

An area between the first risk area L1 and the second risk area L2 may become an area where the ship CS crosses the front of another ship CO. On the other hand, an area rearward of the first risk area L1 and an area forward of the second risk area L2 may become areas where the ship CS crosses the rear of another ship CO. When the ship CS crosses the front of another ship CO, it may need to be more careful, compared with the case where the ship CS crosses the rear of another ship CO.

Alternatively, the risk area identifying part 13 may determine that the risk of a collision is more than the threshold, for example, when the cautious area P set within the area of the ship CS or around the ship CS overlaps with a cautious area set within the area of another ship CO or around another ship CO. Alternatively, the risk area identifying part 13 may determine that the risk of a collision is more than the threshold, for example, when the separated distance between the point indicative of the estimated position of the ship CS and the point indicative of the estimated position of another ship CO is below a threshold.

Returning to FIG. 3, the endpoint information calculating part 14 may calculate endpoint information indicative of a front-or-rear relationship between the ship CS and another ship CO at endpoints L1R, L1F, L2R, and L2F of the risk areas L1 and L2. The endpoint information may be calculated, for example, based on a BCR (Bow Crossing Range).

The BCR may be an estimated distance from the ship CS to another ship CO when another ship CO crosses the heading line of the ship CS. When the BCR is positive, it means that the ship CS crosses the rear of another ship CO, and when the BCR is negative, it means that the ship CS crosses the front of another ship CO.

In the example of FIG. 4, the BCR may become positive at the rear end L1R of the first risk area L1, and the BCR may become negative at the front end L1F of the first risk area L1. Further, the BCR may become negative at the rear end L2R of the second risk area L2, and the BCR may become positive at the front end L2F of the second risk area L2.

Note that, as described above, when the two risk areas L1 and L2 exist, since an area therebetween becomes the area where the ship CS crosses the front of another ship CO, and the front-or-rear relationship between the ship CS and another ship CO at the endpoints is clear, it may not be necessary to calculate the BCR.

Alternatively, since the front-or-rear relationship between the ship CS and another ship CO is taken into consideration in the process of obtaining the overlapping relationship between the ship CS and another ship CO (that is, a similar calculation to the BCR is performed), this result may instead be used.

The endpoint shape determining part 15 may determine the shape of the ends of the OZT based on the endpoint information at the endpoints L1R, L1F, L2R, and L2F of the risk areas L1 and L2. The shape of the ends of the OZT will be described later.

The display controlling part 16 may generate an indication image DM based on the-ship data acquired by the-ship data acquiring part 11, other-ships data acquired by other-ships data acquiring part 12, and the risk areas L1 and L2 calculated by the risk area identifying part 13, and transmit it to the display unit 2. The indication image DM transmitted to the display unit 2 may be displayed on the screen of the display unit 2.

Figure 5:
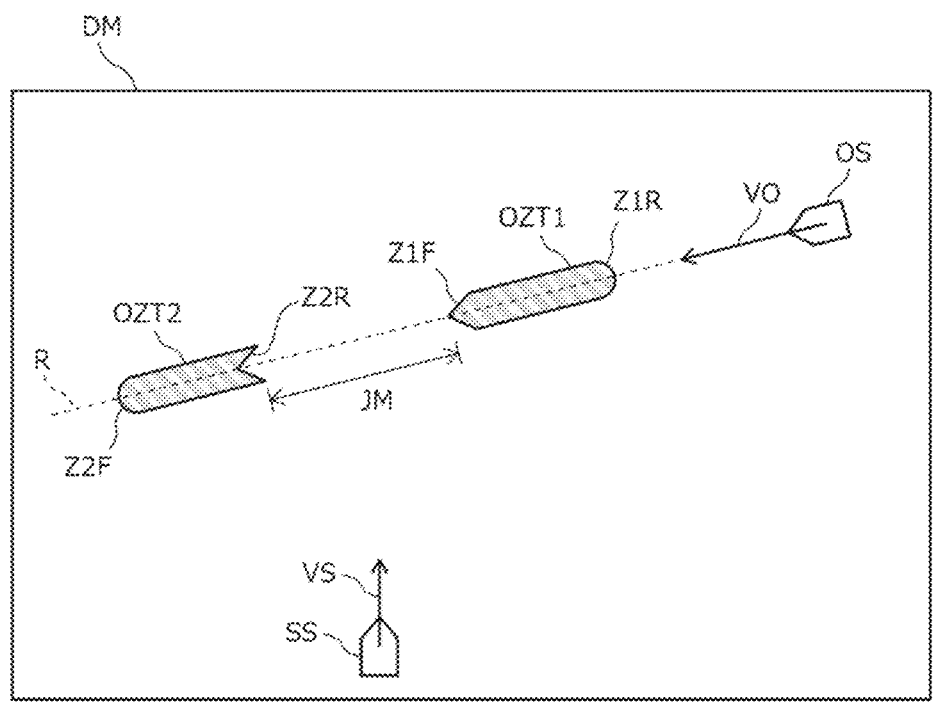
FIG. 5 is a view illustrating one example of an image for indication.

FIG. 5 is a view illustrating one example of the indication image DM. The indication image DM may be an image for indicating a spatial relationship between the ship and another ship. In the indication image DM, the-ship object SS indicative of the ship, and another ship object OS indicative of another ship may be disposed at positions in the image corresponding to actual positions.

Vector lines VS and VO indicative of the velocity vectors may be added to the-ship object SS and another ship object OS. In the indication image DM, the scheduled route of the ship acquired from the ECDIS 7 and a nautical chart around the ship may further be displayed.

In the indication image DM, the estimated course R of another ship calculated based on other-ships data may be displayed, and on the estimated course R, OZT1 and OZT2 may be displayed as the collision risk areas. Each of the OZT1 and the OZT2 may have a constant width, and have the shape extending in the same direction as the estimated course R of another ship.

The OZT1 and the OZT2 may be displayed in the risk areas L1 and L2 which are identified by the risk area identifying part 13 (see FIG. 4). The OZT1 may be displayed in the first risk area L1, and the OZT2 may be displayed in the second risk area L2.

In detail, the OZT1 may include the first risk area L1, where a rear end part of the OZT1 corresponds to the rear end L1R of the first risk area L1, and a front end part of the OZT1 corresponds to the front end L1F of the first risk area L1.

Further, the OZT2 may include the second risk area L2, where a rear end part of the OZT2 corresponds to the rear end L2R of the second risk area L2, and a front end part of the OZT2 corresponds to the front end L2F of the second risk area L2.

Among these, a front end part Z1F of the OZT1 and a rear end part Z2R of the OZT2 which sandwich an area JM where the ship CS crosses the front of another ship CO may be displayed discriminatingly from other end parts (a rear end part Z1R of the OZT1 and a front end part Z2F of the OZT2).

That is, the shape of the front end part Z1F of the OZT1 and the rear end part Z2R of the OZT2 may be different from other end parts (the rear end part Z1R of the OZT1 and the front end part Z2F of the OZT2) in order to indicate that it is the area JM where the ship CS crosses the front of another ship CO.

In the example of FIG. 5, the front end part Z1F of the OZT1 and the rear end part Z2R of the OZT2 may have the shape which indicates the traveling direction of another ship. For example, the front end part Z1F of the OZT1 may have an angled shape which is protruded in the traveling direction of another ship. The rear end part Z2R of the OZT2 may have an angled shape which is dented in the traveling direction of another ship.

Thus, since the area JM where the ship CS crosses the front of another ship CO is sandwiched between the front end part Z1F of the OZT1 and the rear end part Z2R of the OZT2 which have the shape indicating the traveling direction of another ship, it becomes easier to grasp the area JM where the ship CS crosses the front of another ship CO, and it also becomes easier to grasp the traveling direction of another ship.

On the other hand, the rear end part Z1R of the OZT1 and the front end part Z2F of the OZT2 may have a semicircular shape which is not the shape indicating the traveling direction of another ship. Thus, it becomes easier to discriminate the area JM where the ship CS crosses the front of another ship CO from the area where the ship CS crosses the rear of another ship CO.

Conversely, the front end part Z1F of the OZT1 and the rear end part Z2R of the OZT2 which sandwich the area JM where the ship CS crosses the front of another ship CO may have a semicircular shape, and other end parts (the rear end part Z1R of the OZT1 and the front end part Z2F of the OZT2) may have a shape indicating the traveling direction of another ship. Thus, it also becomes easier to discriminate the area JM where the ship CS crosses the front of another ship CO from the area where the ship CS crosses the rear of another ship CO.

Figure 6:
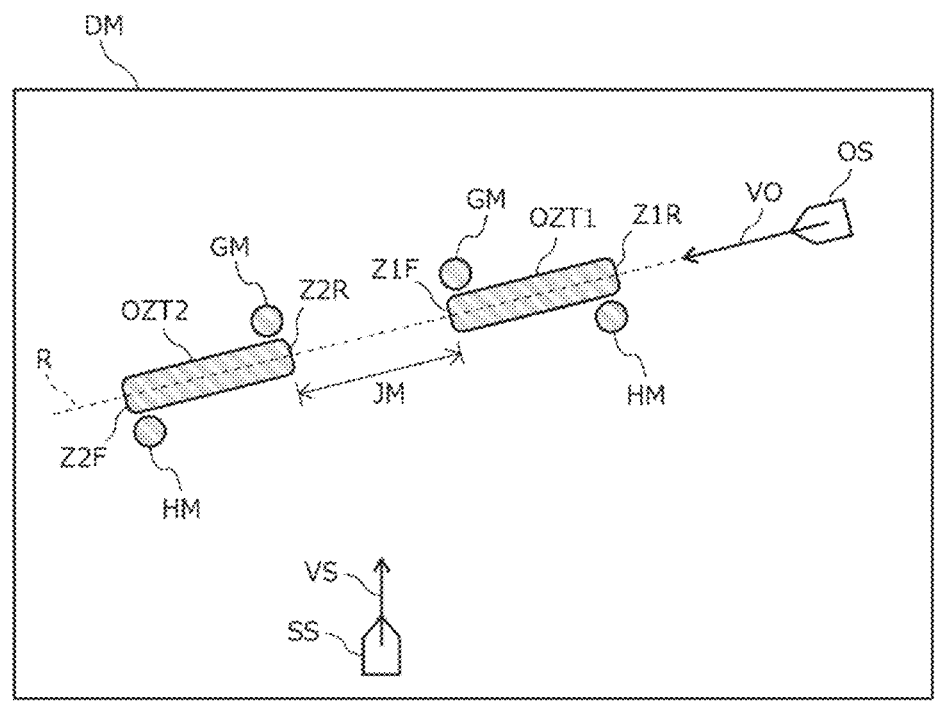
FIG. 6 is a view illustrating one example of the image for indication.
Figure 7:
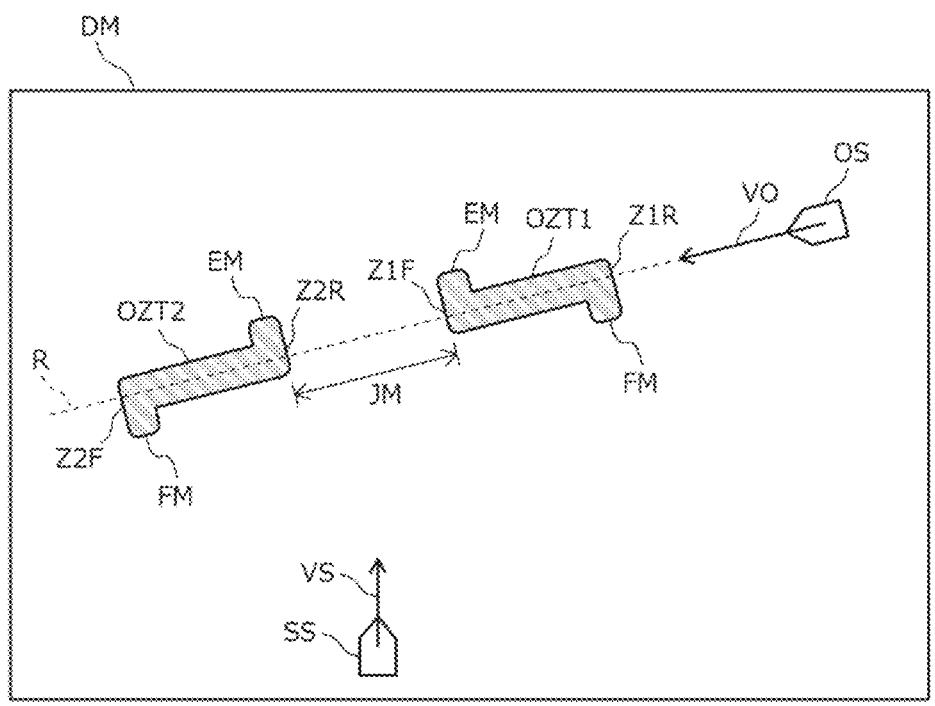
FIG. 7 is a view illustrating one example of the image for indication.

Further, as illustrated in FIGS. 6 and 7, marks GM, HM, and FM having a given shape indicative of an encounter relationship between the ship CS and another ship CO may be added to the end parts Z1F, Z1R, Z2F, and Z2R of the OZT1 and the OZT2.

In detail, as illustrated in FIG. 6, by adding, for example, dot-shaped marks GM at the sides away from the ship CS, of the front end part Z1F of the OZT1 and the rear end part Z2R of the OZT2 which sandwich the area JM where the ship CS crosses the front of another ship CO, it becomes visually intelligible that the ship CS crosses the front of another ship CO.

Additionally, by adding, for example, dot-shaped marks HM at the sides closer to the ship CS, of other end parts (the rear end part Z1R of the OZT1 and the front end part Z2F of the OZT2), it becomes visually intelligible that the ship CS crosses the rear of another ship CO. Note that one of the marks GM and HM may be omitted.

Similarly, as illustrated in FIG. 7, by adding protruded marks EM which protrude away from the ship CS, of the front end part Z1F of the OZT1 and the rear end part Z2R of the OZT2 which sandwich the area JM where the ship CS crosses the front of another ship CO, it becomes visually intelligible that the ship CS crosses the front of another ship CO.

Additionally, by adding protruded marks FM which protrude toward the ship CS, of other end parts (the rear end part Z1R of the OZT1 and the front end part Z2F of the OZT2), it becomes visually intelligible that the ship CS crosses the rear of another ship CO. Note that one of the marks EM and FM may be omitted.

Note that, the shapes or the marks which indicate the traveling direction of another ship may also be provided to the OZT1 and the OZT2 illustrated in FIGS. 6 and 7, or the shapes or the number of marks may be changed according to the velocity of another ship as will be described later.

Figure 8:
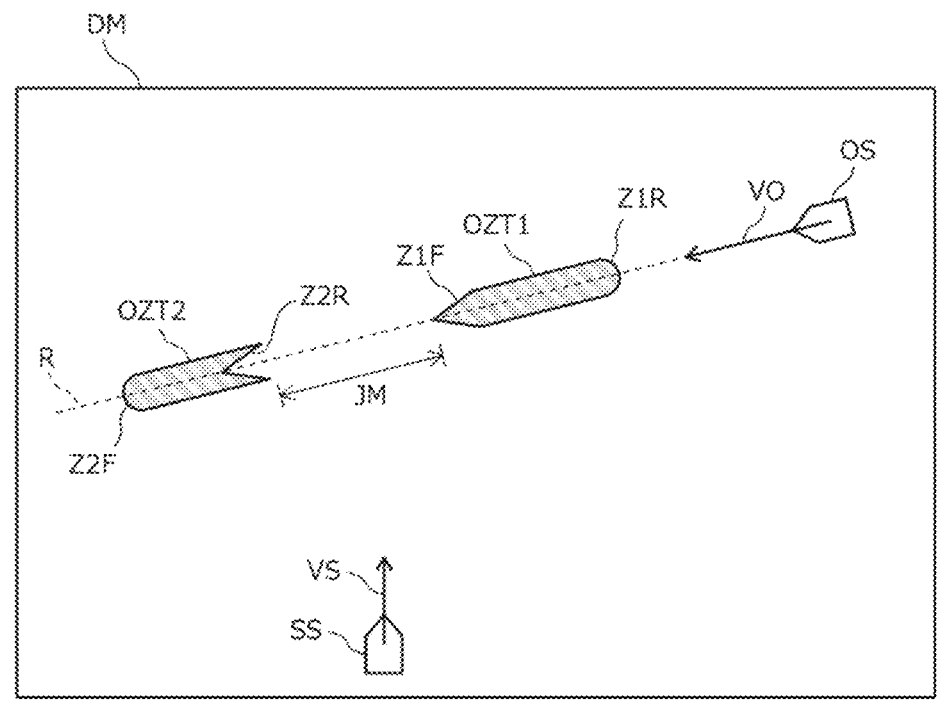
FIG. 8 is a view illustrating one example of the image for indication.
Figure 9:
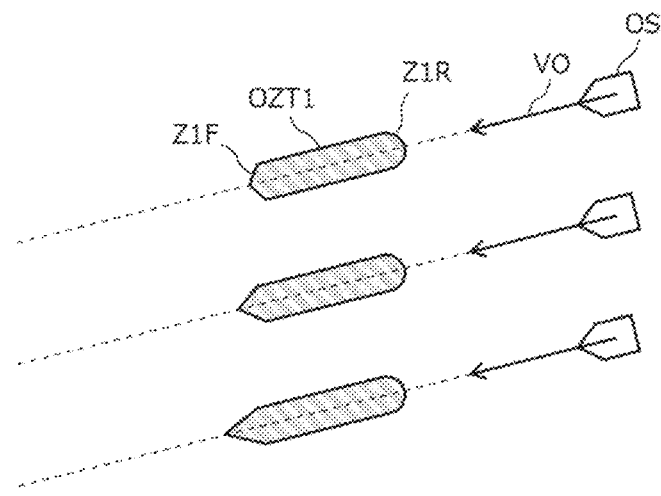
FIG. 9 is a view illustrating one example of the image for indication.

Further, as illustrated in FIGS. 8 and 9, the display controlling part 16 may change the shapes of the front end part Z1F of the OZT1 and the rear end part Z2R of the OZT2, which indicate the traveling direction of another ship according to the speed of another ship. For example, the angled shape which is protruded or dented in the traveling direction of another ship may be expanded so that it becomes more acute in the angle as the speed of another ship increases. Thus, it also becomes easier to grasp the speed of another ship.

Figure 10:
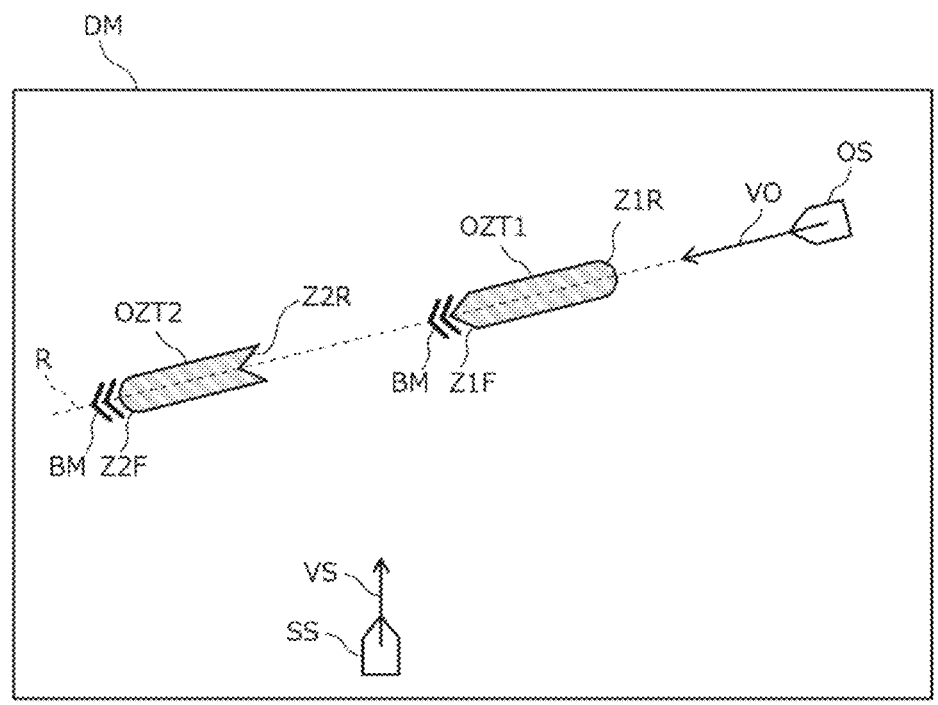
FIG. 10 is a view illustrating one example of the image for indication.
Figure 11:
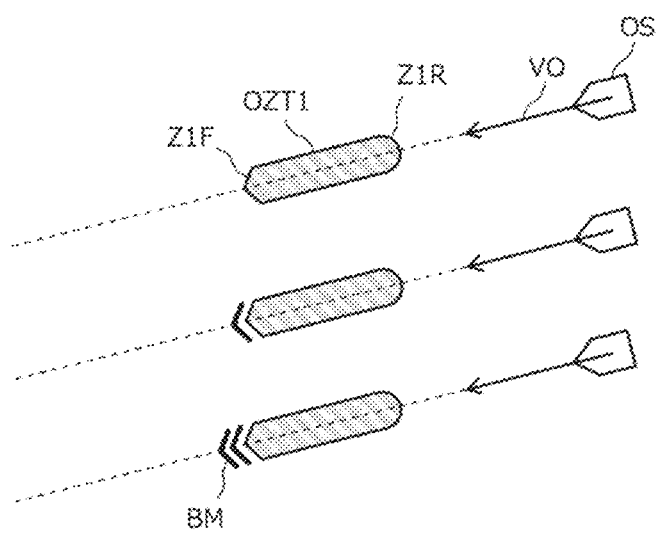
FIG. 11 is a view illustrating one example of the image for indication.

Further, as illustrated in FIGS. 10 and 11, for example, a given-shaped (e.g., a chevron shape) mark BM indicating the traveling direction of another ship may be added to the front end part Z1F of the OZT1 and the front end part Z2F of the OZT2, and the number of marks BM may be changed according to the speed of another ship. For example, the number of marks BM may be increased as the speed of another ship increases. This also makes it easier to grasp the speed of another ship.

Although one embodiment of the present disclosure is described above, the present disclosure is not limited to the embodiment described above, and it is needless to say for the person skilled in the art that various changes are possible.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Ship Monitoring Device, 2 Display Unit, 3 Radar, 4 AIS, 5 GNSS Receiver, 6 Gyrocompass, 7 ECDIS, 8 Alarm, 11 The-ship Data Acquiring Part, 12 Other-ships Data Acquiring Part, 13 Risk Area Identifying Part, 14 Endpoint Information Calculating Part, 15 Endpoint Shape Calculating Part, 16 Display Controlling Part, 100 Ship Monitoring System

What is claimed is:

1. A ship monitoring device, comprising:
a display; and
processing circuitry configured to:
acquire first ship data that is indicative of a first position and a first velocity of a first ship,
estimate a first course of the first ship based on the first ship data,
acquire second ship data indicative of a second position and a second velocity of a second ship,
estimate a second course of the second ship based on the second ship data,
estimate a first intersection position where the first course and the second course intersect,
based on the first ship data and the second ship data and a first assumption that the first ship changes the first course in a first arbitrary direction to a third course that intersects the second course, determine a second intersection position, different than the first intersection position, where the third course intersects the second course,
based on the first ship data and the second ship data and a second assumption that the first ship changes the first course in a second arbitrary direction, different from the first arbitrary direction, to a fourth course that intersects the second course, determine a third intersection position, different than the first and second intersection positions, where the fourth course intersects the second course,
determine a first collision risk area encompassing the second intersection position where a first risk of the first ship and the second ship colliding with each other is greater than a predetermined value,
determine a second collision risk area encompassing the third intersection position where a second risk of the first ship and the second ship colliding with each other is greater than the predetermined value,
control the display a geographic display that includes each of:
a first icon representing the first ship at the first position,
a second icon representing the second ship at the second position,
the second course,
the first collision risk area along the second course,
the second collision risk along the second course, and
wherein the first collision risk area is displayed along the second course as a first elongated shape,
wherein the second collision risk area is displayed along the second course as a second elongated shape,
wherein the first collision risk area has a first leading end part and a first trailing end part that are displayed differently,
wherein the second collision risk area has a second leading end part and a second trailing end part that are displayed differently,
wherein the second collision risk area is geographically separated from the first collision risk area along the second course by a separation region centered on the first intersection position,
wherein the separation region is a region encompassing intersection positions corresponding to changes to the first course that result in a third risk of the first ship and the second ship colliding with each other that is less than the predetermined value.

2. The ship monitoring device of claim 1,
wherein the first leading end part is displayed differently from the second trailing end part, and
wherein the first trailing end part is displayed differently from the second leading end part.

3. The ship monitoring device of claim 1,
wherein the first leading end part is displayed with a first difference from the first trailing end part, wherein the first difference indicates the second course,
wherein the second leading end part is displayed with a second difference from the second trailing end part, wherein the second difference indicates the second course.

4. The ship monitoring device of claim 3, wherein the first leading end part and the second leading end part are each displayed with a protruding shape indicating a leading direction of the second course.

5. The ship monitoring device of claim 3, wherein the first leading end part and the second leading end part are each displayed with an indented shape indicating a leading direction of the second course.

6. The ship monitoring device of claim 5, wherein the indented shape comprises one of an indented V-shape or an indented semicircular shape.

7. The ship monitoring device of claim 3, wherein the protruding shape comprises one of a protruding V-shape or a protruding semicircular shape.

8. The ship monitoring device of claim 1,
wherein the first leading end part and the second trailing end part displayed as a first shape on a first side of the second course, and
wherein the first leading end part and the second trailing end part displayed as a second shape on a second side of the second course opposite to the first side.

9. The ship monitoring device of claim 1, wherein the processing circuitry controls the display to display at least one mark in front of each of the first and second leading end parts, each of the at least one mark having a shape indicative of the second course.

10. The ship monitoring device of claim 1, wherein the processing circuitry controls the display to display at least one mark behind each of the first and second trailing end parts, each of the at least one mark having a shape indicative of the second course.

11. The ship monitoring device of claim 9, wherein a number of the at least one marks corresponds to the second velocity.

12. The ship monitoring device of claim 10, wherein a number of the at least one marks corresponds to the second velocity.

13. A non-transitory computer-readable medium having stored thereon computer-executable instructions which, when executed by a computer, cause the computer to perform a method, the method comprising:
    acquiring first ship data that is indicative of a first position and a first velocity of a first ship,
    estimating a first course of the first ship based on the first ship data,
    acquiring second ship data indicative of a second position and a second velocity of a second ship,
    estimating a second course of the second ship based on the second ship data,
    estimating a first intersection position where the first course and the second course intersect,
    based on the first ship data and the second ship data and a first assumption that the first ship changes the first course in a first arbitrary direction to a third course that intersects the second course, determining a second intersection position, different than the first intersection position, where the third course intersects the second course,
    based on the first ship data and the second ship data and a second assumption that the first ship changes the first course in a second arbitrary direction, different from the first arbitrary direction, to a fourth course that intersects the second course, determining a third intersection position, different than the first and second intersection positions, where the fourth course intersects the second course,
    determining a first collision risk area encompassing the second intersection position where a first risk of the first ship and the second ship colliding with each other is greater than a predetermined value,
    determining a second collision risk area encompassing the third intersection position where a second risk of the first ship and the second ship colliding with each other is greater than the predetermined value,
    controlling a display to display a geographic display that includes each of:
        a first icon representing the first ship at the first position,
        a second icon representing the second ship at the second position,
        the second course,
        the first collision risk area along the second course,
        the second collision risk along the second course, and
    wherein the first collision risk area is displayed along the second course as a first elongated shape,
    wherein the second collision risk area is displayed along the second course as a second elongated shape,
    wherein the first collision risk area has a first leading end part and a first trailing end part that are displayed differently,
    wherein the second collision risk area has a second leading end part and a second trailing end part that are displayed differently,
    wherein the second collision risk area is geographically separated from the first collision risk area along the second course by a separation region centered on the first intersection position,
    wherein the separation region is a region encompassing intersection positions corresponding to changes to the first course that result in a third risk of the first ship and the second ship colliding with each other that is less than the predetermined value.

14. The ship monitoring device of claim 1, wherein the first ship data is acquired by the processing circuitry from a GNSS (Global Navigation Satellite System) receiver mounted on the first ship.

15. The ship monitoring device of claim 1, wherein the second ship data is acquired by the processing circuitry from a radar mounted on the first ship.

16. The ship monitoring device of claim 1, wherein the second ship data is acquired by the processing circuitry from an AIS (Automatic Identification System) mounted on the first ship.

17. The ship monitoring device of claim 16, wherein the second ship data is acquired by the processing circuitry from an AIS (Automatic Identification System) mounted on the first ship.

18. A ship monitoring method performed by a ship monitoring device that includes a display and processing circuitry, the ship monitoring comprising:
    acquiring first ship data that is indicative of a first position and a first velocity of a first ship,
    estimating a first course of the first ship based on the first ship data,
    acquiring second ship data indicative of a second position and a second velocity of a second ship,
    estimating a second course of the second ship based on the second ship data,
    estimating a first intersection position where the first course and the second course intersect,
    based on the first ship data and the second ship data and a first assumption that the first ship changes the first course in a first arbitrary direction to a third course that intersects the second course, determining a second intersection position, different than the first intersection position, where the third course intersects the second course,
    based on the first ship data and the second ship data and a second assumption that the first ship changes the first course in a second arbitrary direction, different from the first arbitrary direction, to a fourth course that intersects the second course, determining a third intersection position, different than the first and second intersection positions, where the fourth course intersects the second course,
    determining a first collision risk area encompassing the second intersection position where a first risk of the first ship and the second ship colliding with each other is greater than a predetermined value,
    determining a second collision risk area encompassing the third intersection position where a second risk of the first ship and the second ship colliding with each other is greater than the predetermined value,
    controlling the display to display a geographic display that includes each of:
        a first icon representing the first ship at the first position,
        a second icon representing the second ship at the second position,
        the second course,
        the first collision risk area along the second course,
        the second collision risk along the second course, and wherein the first collision risk area is displayed along the second course as a first elongated shape, wherein the second collision risk area is displayed along the second course as a second elongated shape, wherein the first collision risk area bas a first leading end part and a first trailing end part that are displayed differently, wherein the second collision risk area has a second leading end part and a second trailing end part that are displayed differently, wherein the second collision risk area is geographically separated from the first collision risk area along the second course by a separation region centered on the first intersection position, wherein the separation region is a region encompassing intersection positions corresponding to changes to the first course that result in a third risk of the first ship and the second ship colliding with each other that is less than the predetermined value.

* * * * *